United States Patent [19]

Lofftus

[11] Patent Number: 5,575,940

[45] Date of Patent: Nov. 19, 1996

[54] INVERSE LIMITED COALESCENCE PROCESS

[75] Inventor: Kevin D. Lofftus, Rochester, N.Y.

[73] Assignee: Eastman Kodak Company, Rochester, N.Y.

[21] Appl. No.: 309,431

[22] Filed: Sep. 20, 1994

Related U.S. Application Data

[63] Continuation-in-part of Ser. No. 888,063, May 26, 1992, abandoned.

[51] Int. Cl.$^6$ ................................................. C04B 35/26
[52] U.S. Cl. ........................ 252/62.63; 252/62.51 R; 252/62.56; 252/62.54; 252/301.4 R; 252/301.4 S; 23/313 R; 430/137
[58] Field of Search ............................. 430/137; 323/339, 323/332; 252/301.4 R, 301.4 S, 62.51, 62.56, 62.54, 62.63; 23/313 R

[56] References Cited

U.S. PATENT DOCUMENTS

| | | | |
|---|---|---|---|
| 4,345,014 | 8/1982 | Oka et al. ................................ | 430/122 |
| 4,507,396 | 3/1985 | Hickson ................................... | 502/8 |
| 4,546,060 | 10/1985 | Miskinis et al. ......................... | 430/108 |
| 5,061,586 | 10/1991 | Saha et al. .............................. | 430/108 |
| 5,268,249 | 12/1993 | Saha et al. .............................. | 430/106.6 |
| 5,764,445 | 8/1988 | Miskinis et al. ......................... | 430/108 |

*Primary Examiner*—Melissa Bonner
*Attorney, Agent, or Firm*—Nixon, Hargrave, Devans and Doyle; Anne B. Kiernan

[57] ABSTRACT

Particles having a controlled particle size distribution and morphology are made from inorganic hydrophilic materials by dispersing inorganic hydrophilic material in a dispersant to form a dispersion phase, and mixing the dispersion phase with a substantially water-immiscible suspending liquid, which is less polar than the dispersant, to form a suspension of dispersion phase droplets in the suspending liquid. The dispersion phase droplets are stabilized by a dispersion of an organic colloidal stabilizer which is added either to the suspending liquid before mixing or to the suspension of dispersion phase droplets after mixing. The organic stabilizer limits the coalescence of the dispersion phase droplets. The dispersant is removed to form solid inorganic particles having a controlled particle size distribution and morphology.

36 Claims, No Drawings

INVERSE LIMITED COALESCENCE PROCESS

This application is a continuation-in-part of U.S. patent application Ser. No. 07/888,063, filed May 26, 1992, entitled "INVERSE LIMITED COALESCENCE PROCESS" now abandoned.

FIELD OF THE INVENTION

The present invention relates to a method of preparing particles having a controlled particle size distribution and morphology. More particularly, the present method relates to the preparation of particles from hydrophilic materials by inverse limited coalescence. The particles produced by the present process are useful as carrier material for electrographic toner, ceramic powders, and other inorganic hydrophilic materials that require particles with a controlled size distribution and/or controlled morphology.

BACKGROUND OF THE INVENTION

Particles made from inorganic hydrophilic materials and useful as carriers for electrographic toners are prepared by numerous methods, probably the most primitive of which is grinding the bulk material to a suitable particle size and/or particle size distribution. The disadvantages of this process are widely known. Initially, the particles are irregularly shaped after grinding and may not be suitable for their intended purpose. Second, some materials are not amendable to grinding due to their physical properties. Third, the particle size distribution produced by grinding is broad.

In typical copying processes, toner and/or carrier particles are subject to electrostatic and other forces that affect the particles differently depending on their size. Therefore, in order to obtain high quality copies, it is preferred that toner and/or carrier particles have a controlled morphology and narrow size distribution. Past methods of attaining particles of the desired size and size distribution include sizing the toner and/or carrier particles by passing the ground polymer through progressively smaller sieves to classify the particles by size. Recently, to avoid this expensive and time consuming process, new methods have been developed to produce particles having a controlled size distribution and morphology.

Other methods of forming particles from hydrophilic material include dispersing the hydrophilic material in a liquid dispersant. Examples include rotary spray drying, ultrasonic spray drying, ultrasonic dispersion in an immiscible liquid, or shear dispersion in an immiscible liquid. The size distribution and morphology of the particles formed by these processes is dependent upon the manner in which the dispersion is broken into droplets and the dispersant removed. Typically, the resultant particle size of the material is directly related to the droplet size formed by the processing equipment. These methods all possess the disadvantage of forming particles with a generally broad particle size distribution.

A method commonly known as "limited coalescence" has been applied to solutions or dispersions of hydrophobic, polymeric materials in U.S. Pat. Nos. 4,833,060 to Nair, et al. and 4,965,131 to Nair, et al. (collectively, the "Nair processes"). These limited coalescence processes have the advantage of controlling the final droplet size independent of the means by which the solution or dispersion is broken into droplets. In limited coalescence methods, the solution or dispersion is broken into droplets much smaller than the desired final droplet size by shearing the dispersion of hydrophobic material in an immiscible suspending liquid, usually water, containing a colloidal stabilizer. The droplets coalesce upon the removal of shearing forces and the colloidal stabilizer preferentially adsorbs at the interface between the immiscible liquids and limits the coalescence of the droplets. Therefore, the amount of stabilizer, not the type of shear, determines the final droplet size. It has been found that narrow particle size distributions are generated when the solution or dispersion is broken into droplets substantially smaller than the final droplet size.

To be effective, the colloidal stabilizer must be well dispersed in the suspending liquid. Electrostatic stabilization of the colloid through ionization of groups on the colloid or surfactants adsorbed on the colloid is effective to disperse the colloid in polar suspending liquids. Current limited coalescence methods which employ electrostatic stabilization of the colloid are, however, restricted to systems where the suspending liquid is more polar than the dispersant.

The Nair processes are also limited to the formation of particles from hydrophobic materials, such as polymeric materials useful as electrographic toners. U.S. Pat. No. 4,506,062 to Flesher, et al. ("Flesher") discloses an inverse suspension polymerization process in which an aqueous solution of polymerizable material is dispersed as droplets in a water immiscible liquid. A dispersion of suspension stabilizer is added to the water-immiscible liquid before the polymerization material is dispersed with the liquid. The material is polymerized in the droplets to form a dispersion of solidified particles in the non-aqueous liquid. Flesher relies on solvation of the stabilizer by the water-immiscible liquid to obtain a uniform dispersion of the stabilizer in the suspension. The stabilizer is attracted to the water droplet interface by ionic groups of the stabilizer and fixed there by an oppositely charged costabilizer which is insoluble in the non-aqueous liquid. Flesher, essentially, requires the dissolved molecules or solvated colloids of stabilizer to be in equilibrium with the water-immiscible liquid before the addition of the water phase. This limits the variety of stabilizers that can be used in the Flesher process because a stabilizer's ionizable groups must ionize upon the addition of the aqueous phase so that the stabilizer is attracted to the water phase droplets. Thus, even if a stabilizer is sufficiently hydrophilic in the absence of water to work as a suspension stabilizer in the Flesher process, surfactants are required to disperse them in the hydrophobic phase. Surfactants, however, typically interfere with the stabilization of the droplets.

In addition, Flesher addresses only suspension polymerization of hydrophilic materials to form particles having a narrow size distribution and controlled morphology. In suspension polymerization processes, the polymerization process itself solidifies the particles from the coalesced droplets and there is no solvent to remove. Therefore, there continues to be a need for methods of forming particles having a controlled particle size distribution and morphology from dispersion of inorganic hydrophilic materials.

SUMMARY OF THE INVENTION

The present invention relates to a method of making particles having a controlled morphology and particle size distribution from a dispersion of inorganic hydrophilic materials using an organic colloidal dispersion of a stabilizer.

The present method includes first dispersing an inorganic hydrophilic material in a hydrophilic dispersant to form a dispersion phase. The dispersion phase is then mixed with a suspending liquid, which is substantially immiscible with the dispersant and less polar than the dispersant, under high shear to produce a suspension of coalesced dispersion phase droplets in the suspending liquid after the shear is removed. The suspension contains a colloidal dispersion of an organic stabilizer which controls the dispersion phase droplets' coalescence. The dispersant is then removed from the coalesced droplets to form solid inorganic particles having a controlled size distribution and morphology.

The dispersion of the organic stabilizer can be added either to the suspending liquid before it is mixed with the dispersion phase or to the suspension after the mixing has occurred.

The dispersion of organic colloidal stabilizer is itself stabilized in suspension either electrostatically, by solvation in the suspending liquid, or by a combination of electrostatic stabilization and solvation. If the colloidal dispersion of stabilizer is electrostatically stabilized, the suspension has a pH either in the range of about $pk_a$ to $pk_a+5$ if the stabilizer to be used has an acid group, at a pH in the range of about $14-pk_b$ to $9pk_b$ if the stabilizer to be used has a base group, or within 5 pH units of the stabilizer's isoelectric point if the stabilizer is amphoteric, wherein $pk_a$ is the acid group's $pk_a$ and the $pk_b$ is the base group's $pk_b$.

The present invention also provides a method of making ferrite carrier particles for electrostatographic development using the inverse limited coalescence process. The method includes first dispersing a ferrite-forming material in a hydrophilic dispersant to form a dispersion phase. The dispersion phase is then mixed with a suspending liquid, which is substantially immiscible with the dispersant and less polar than the dispersant, under high shear to produce a suspension of coalesced dispersion phase droplets in the suspending liquid after the shear is removed. The suspension contains a colloidal dispersion of an organic stabilizer which controls the dispersion phase droplets' coalescence. The dispersant is then removed from the coalesced droplets to form nonmagnetic, solid inorganic particles having a controlled size distribution and morphology. Finally, the nonmagnetic, solid inorganic particles are fired to form magnetic, solid ferrite carrier particles having a controlled particle size distribution and morphology. The ferrite carrier particles may also be dispersed in a glassy material suitable to reduce the amount of toner throw-off exhibited by the ferrites without effecting the high magnetic properties of the ferrites.

Although the particles formed from the present method are generally spherical in shape, uniformly-shaped, non-spherical particles can also be formed by forming an irreversible skin of the colloidal stabilizer around the coalesced droplets.

The method of the present invention produces inorganic hydrophilic particles exhibiting controlled morphology and particle size distribution. The method of the present invention, although useful with virtually any inorganic hydrophilic material, is particularly useful to produce solidified inorganic hydrophilic particles suitable for use as carrier material in electrostatographic processes.

DETAILED DESCRIPTION OF THE INVENTION

A method for making particles having a controlled size distribution and morphology from hydrophilic materials is disclosed. The particles are useful for making electrographic carriers, ceramic powders, and other inorganic hydrophilic materials that require small particles of controlled size distribution and/or morphology.

The present method includes the steps of dispersing one or more solid inorganic hydrophilic materials in a dispersant to form a dispersion phase. The dispersion phase is mixed with a suspending liquid, which is substantially immiscible with the dispersant, under high shear to produce a suspension of coalesced dispersion phase droplets in the suspending liquid after the shear is removed. The suspension contains a colloidal dispersion of a stabilizer which controls the dispersion phase droplets' coalescence. The dispersant is removed from the coalesced droplets to form solid inorganic particles having a controlled size distribution and morphology.

For the purposes of the present invention, "dispersion" includes both solutions and suspensions of the inorganic hydrophilic material in the dispersant. The dispersant is water or a liquid more polar than the suspending liquid to be used. Exemplary dispersants include, water, methanol, benzyl alcohol, N,N-dimethyl formamide, glycerol, ethylene glycol, and combinations thereof. The dispersant can also contain a surfactant to aid in the dispersion of the inorganic hydrophilic material.

The inorganic hydrophilic material need not have the composition of the final product and can be in the form of precursors that are modified or contain binders that are removed by subsequent processes such as firing. Exemplary hydrophilic materials include inorganic oxides, carbonates, sulfates, phosphates, tungstates, molybdates, titanates, hydroxides and water soluble salts. Especially useful materials include ferric oxide, strontium carbonate, and gum arabic (as binder), used as precursors for forming carrier particles for electrographic toners.

Additionally, particularly useful as the carrier particle in two-component electrostatographic developers, i.e., toner and carrier, are strontium and barium ferrites. Ferrites, as used herein, are magnetic oxides containing iron as a major metallic component. The ferrites of strontium and barium referred to herein are the ferrites of strontium and barium, having the formula $SrFe_{12}O_{19}$ and $BaFe_{12}O_{19}$. These ferrite carriers are disclosed in U.S. Pat. No. 5,268,249 to Saha et al., which disclosure is hereby incorporated by reference. Additional precursors for forming magnetic materials and binders for ferrites are disclosed in U.S. Pat. Nos. 4,345,014, 4,546,060, 4,764,445, and 5,061,586, as further described in co-pending U.S. patent application Ser. No. 07/888,064 to K. D. Lofftus, entitled "SOLVENT EXTRACTION IN LIMITED COALESCENCE PROCESSES," filed May 26, 1992, which disclosures are hereby incorporated by reference.

Such ferrite carrier particles can be produced by first dispersing a ferrite-forming material, such as the oxides or salts of iron and strontium or barium, e.g., the carbonates, nitrates or phosphates convertible to the oxide by heat, in the appropriate proportions, in a hydrophilic dispersant to form a dispersion phase. The dispersion phase is then mixed with a suspending liquid, which is substantially immiscible with the dispersant and less polar than the dispersant, under high shear to produce a suspension of coalesced dispersion phase droplets in the suspending liquid after the shear is removed. The suspension contains a colloidal dispersion of an organic stabilizer which controls the dispersion phase droplets' coalescence. The dispersant is then removed from the coalesced droplets to form solid inorganic particles, i.e., unreacted, nonmagnetic, dried green beads, having a controlled particle size distribution and morphology. In order to prepare the magnetic carrier particles, the green beads are subsequently fired at high temperatures, e.g., to remove the organic binder and organic stabilizer, to form magnetic, solid ferrite carrier particles having a controlled particle size distribution and morphology. The ferrite carrier particles can be used in an electrostatographic developer composition which consists of a mixture of charged toner particles and oppositely charged ferrite carrier particles. Such a composition is suitable, e.g., for magnetic brush development of electrostatic charge patterns.

In addition, the ferrites can be dispersed in a glassy material, e.g., a glass matrix comprised of from about 10 to 20 molar percent $V_2O_5$, from about 10 to 40 molar percent BaO and from about 10 to 40 molar percent of $B_2O_3$. Such a ferrite/glass composite is disclosed in U.S. Pat. No. 5,061,586 to Saha et al., which disclosure is hereby incorporated by reference. The glassy material used with the ferrites is selected to provide the required mechanical and electrical properties. It should (1) adhere well to the magnetic material, (2) facilitate formation of strong, smooth-surfaced particles and (3) preferably possess sufficient difference in triboelectric properties from the toner particles with which it is used to insure the proper polarity and magnitude of electrostatic charge between the toner and carrier when the two are mixed. By dispersing ferrites in a glassy material, the amount of toner throw-off exhibited by such ferrites can be reduced without effecting the high magnetic properties of the ferrites.

There are several advantages conferred upon electrographic developers by carrier particles produced by the method of the present invention. First, the present invention produces fewer fine particles, which have a high charge-to-mass ratio (Q/m) and tend to be developed into the image background resulting in a loss of developer from the toning station. Second, the present invention produces fewer coarse particles, which cause grainy images. Third, the present invention provides the ability to maintain the optimum particle size more easily than spray drying. Lastly, the present invention provides the ability to control particle morphology; e.g., spherical vs. non-spherical, which in turn controls both flow rate of developer over the toning roll (which effects development rates) and flow balance (which effects image uniformity) in the toning station sump. For example, it appears that spherical particles may reduce, and non-spherical particles enhance, the flow rate of developer over the toning roll.

The inverse limited coalescence process of the present invention can also be used to produce phosphors. Images on film can be intensified by placing the film on an image intensifying screen that is coated with phosphors. The phosphors absorb part or all of the source radiation not passing through the film and fluoresce uniformily in all directions. Hence, approximately half of the energy radiated from the phosphor will be directed at the film allowing greater exposure of the film provided that the film is sensitized to the wavelength of photons being radiated by the phosphors. Further, since the phosphors radiate uniformly, there is a spread or defocusing of the image. To reduce the effect of the spread, the phosphor particles must be made as small as possible. However, a minimum thickness of phosphor particles must be applied to the image intensifying screen to absorb most of the source radiation (from the optical image) passing through the film and achieve a reasonable "gain," i.e., the ratio of exposure with the image intensifying screen to that without it. Since multiple layers of very small particles cause scattering of the photons radiated from the phosphors and also image spread, the best condition for sharp images with a high gain is a monolayer of phosphor particles of uniform size. Such particles can be produced by the method of the present invention.

Furthermore, the particular example of a non-magnetic, solid inorganic phosphor particle capable of production by the present invention (barium/strontium sulphate doped with europium) absorbs x-ray radiation and fluoresces ultraviolet radiation (phosphorescence has a time delay between the absorption of the source radiation and emission while fluorescence is an instantaneous process). Fluorescence occurs for about 0.25 up to 0.75 mole percent Eu for mole ratios of Ba to Sr of about 0:1 to 1:0, while the preferred mole ratio of Ba to Sr is approximately 3:1. It is believed that barium improves the x-ray absorption characteristics of the phosphor while strontium improves the emission characteristics.

The concentration of solid inorganic hydrophilic material in the dispersion phase is generally from about 1 to 80 and, preferably, from about 2 to 60 weight percent ("wt %"). The concentration of solid hydrophilic material is maintained at about 30 to 60 wt % for dispersions used to make carrier particles for electrographic toner.

The concentration of the inorganic hydrophilic materials in the dispersion phase is dependent on material properties and process goals. Material properties such as density, particle size and stability of the dispersed solids, as well as molecular weight and solvation of dissolved solids, limit the possible maximum concentrations of hydrophilic material in the dispersion phase. The density of the inorganic hydrophilic material determines the volume concentration for a given weight concentration, and the volume concentration is limited by the maximum dispersion phase viscosity at which effective shearing and coalescence can take place. The volume concentration at this maximum viscosity is a function of the particle size and dispersion stability for the dispersed solids.

The optimum concentration of solids in the dispersion phase is also dependent on the desired particle morphology and size distribution in conjunction with the specific process capacity. The specific process capacity (the unit weight of particles produced per unit volume of suspension) is increased at higher solids concentrations. However, the dispersion phase viscosity also increases at higher solid concentrations, resulting in poorer shearing and coalescence and wider particle size distributions. Additionally, the concentration of solids in the dispersion phase can be used to control particle morphology. For example, given the proper stabilizer conditions whereby an irreversible skin of stabilizer is formed at the dispersion phase droplet surface, the surface area of the droplet can be preserved when the dispersant is removed. Lower solids concentration can be used under these conditions to increase the specific surface area of the particles and achieve the desired particle morphology, generally wrinkled or deflated spheres.

Dispersability of the solids will also affect the maximum concentration of insoluble solids possible in the dispersant. Generally, decreasing the size at which the solids exist in the dispersion increases the viscosity and reduces the maximum possible concentration of solids in the dispersion. For example, hydrophilic precursor materials including ferric oxide and strontium carbonate (useful as electrographic carriers) with a binder of gum arabic can be dispersed in polymethacrylic acid to form a dispersion phase. Milling of this dispersion phase will increase the uniformity of the dispersion, which is desirable for firing. However, the dispersion phase viscosity is also increased, decreasing the ability to shear the dispersion phase with a suspending liquid. Relative to the example above, good particle size distributions are achieved in the inverse limited coalescence process from dispersions containing 58 wt % solids in water when ball milled with 3 mm stainless steel shot for 24 hours. The dispersion must, however, be diluted to about 52 wt % solids when milled for 4 days.

The dispersion phase is introduced into a suspending liquid which is substantially immiscible with the dispersant and less polar than the dispersant. A slight mutual miscibility is preferred to remove the dispersant after particle formation. The suspending liquid should be chosen to, preferably, have a mutual miscibility from about 0.5 to 25 and, most preferably, from about 1 to 10 wt % dispersant in the suspending liquid. Additionally, the mutual miscibility of the of the suspending liquid in the dispersant should be about the same and, preferably, smaller than the mutual miscibility of the dispersant in the suspending liquid. This is preferred because dissolution of the suspending liquid into the dispersant decreases the degree of dispersion of the solid materials, decreases the surface tension between the two surfaces which makes stabilization more difficult, and increases the relative volume of the dispersion phase. These factors, in turn, result in more suspending liquid added to the system, decreasing specific process capacity, and increased amounts of stabilizer required to obtain a particular particle size.

When water is the dispersant, exemplary suspending liquids include normal, secondary, tertiary, or cyclic alcohols containing at least four carbon atoms, aromatic alcohols (e.g., phenols, phenyl aliphatic alcohols, and benzyl alcohol), ketones with three or more carbon atoms, halogenated solvents (e.g., methylene chloride), and esters (e.g., aliphatic acetates, propionates, and the like). Combinations of suspending liquid can be used to obtain desired physical properties (e.g., density, vapor pressure, surface tension, or mutual miscibility with the dispersant). Cosolvents such as acetone and alcohols having three or less carbon atoms can also be used to achieve the desired mutual miscibility with completely immiscible suspending liquids such as aliphatic and aromatic liquids.

When polar, non-aqueous dispersants are used, nonpolar suspending liquids such as aliphatic liquids, (e.g., branched or linear paraffins) can be used. When a very polar, organic dispersant (e.g., glycerol or methanol) is used, cyclohexane is a useful suspending liquid. In addition, polar solvents such as lower ketones or isoamyl alcohol are useful suspending liquids when glycerol is the dispersant.

The weight ratio of the dispersion phase to suspending liquid must be sufficiently small to allow the dispersion phase to be discontinuous within the continuous suspending liquid upon shear mixing. However, the weight ratio should be maintained at as a high a level as possible so that the specific process capacity is optimized. Another objective of maintaining a high weight ratio of dispersion phase to suspending liquid is to increase the coalescence rate of very small droplets produced by shearing relative to the larger droplets, thus reducing the width of the size distribution of the droplets. For a low density dispersion phase such as a methanol-polymer solutions, a weight ratio of dispersion phase to suspending liquid in the range from about 0.1:1 to 0.4:1, preferably about 0.25:1 to 0.35:1, is generally maintained. For a high density dispersion phase in a low density suspending phase (e.g., ferric oxide, strontium carbonate, and gum arabic dispersed in water) a weight ratio of dispersion phase to suspending liquid in the range from about 0.3:1 to 0.65:1, preferably about 0.4:1 to 0.6:1, is generally maintained.

The suspension contains a colloidal dispersion of an organic stabilizer which acts to stabilize the dispersion phase droplets formed by shearing in the suspending liquid. The colloidal stabilizer is adsorbed at the interface between the dispersion phase and the suspending liquid and limits the coalescence that the dispersion phase droplets can undergo upon removal of the shearing force. The size and shape of the droplets after coalescence define the size distribution and morphology of particles produced by the limited coalescence process. A high weight ratio of dispersion phase to suspending liquid increases the relative rate of coalescence of finer droplets and produces a narrower particle size distribution.

Size distributions of particles formed by the present method are typically log-normal with coarseness and fineness indices in the range of 1.08 to 1.25. The coarseness index is defined as the ratio of the 84th volume percentile diameter to the volume median diameter of the particles. The fineness index is defined as the ratio of the number mean diameter to the 16th number percentile diameter of the particles. Grinding typically produces particles with indices greater than 2 and classification can be used to attain indices in the range of 1.2 to 1.8 from the ground particles.

The colloidal stabilizer can be added either to the suspending liquid before the dispersion phase is mixed with the suspending liquid or directly to the suspension after the dispersion phase and suspending liquid are mixed together. However, in either case, obtaining a uniform distribution of the colloidal stabilizer in the suspension is required for the limited coalescence process to work. To achieve a uniform distribution of colloidal stabilizer in the suspension, the colloidal stabilizer itself must be stabilized. The colloidal stabilizer must be stabilized sufficiently to prevent irreversible aggregation of the stabilizer particles, which would prevent the stabilizer particles from surrounding the dispersion phase droplets and limiting the coalescence the dispersion phase droplets can undergo.

In the method of the present invention, the colloidal stabilizer is stabilized either by electrostatic stabilization, solvation, or a combination of electrostatic stabilization and solvation. Electrostatic stabilization is achieved by utilizing stabilizers with ionizable groups. In polar liquids (e.g., water) the ionizable groups are separated which serves to stabilize the colloidal stabilizer. The stabilizer is electrostatically stabilized by adjusting the stabilizer's degree of ionization. The degree of ionization is regulated through control of the potential-determining ion.

For example, the potential-determining ion for acids is H+ and, therefore, a Bronsted base (e.g., primary, secondary, tertiary, or quaternary amines) that is soluble in the suspending liquid can be used to maintain charge separation of the ionic groups on the colloid. To maintain electrostatic stabilization of the stabilizer in the suspension, the suspension should have a pH either in the range of about $pk_a$ to $pk_a+5$ if the stabilizer to be used has an acid group, at a pH in the range of about $14-pk_b$ to $9-pk_b$ if the stabilizer to be used has a base group, or within 5 pH units of the stabilizer's isoelectric point if the stabilizer is amphoteric. $pk_a$ is a value representing the extent of dissociation of a stabilizer's acid group and is defined by the base 10 logarithm of the inverse of the equilibrium constant of the acid dissociation. Likewise, $pk_b$ is a value representing the extent of dissociation of a stabilizer's base group and is defined by the base 10 logarithm of the inverse of the equilibrium constant of the base dissociation. The isoelectric point of the stabilizer is the pH at which the net charge on a colloid in a solution is zero.

The pH of the suspension can be regulated either through additives mixed with the dispersion phase that provide the required pH in the suspension after mixing of the dispersion phase with the suspending liquid or by mixing additives with the resultant suspension after the dispersion phase and suspending liquid are mixed. For example, buffering salts can be added to the suspending liquid in the present method. However, sufficient dissociation of the buffering salts to regulate the pH occurs in the more polar dispersion phase and not in the nonpolar suspending liquid. Considerable solvation of part of the salt molecule by the suspending liquid is required to dissolve the buffering salt and this can prevent the salt ions from entering the dispersion phase droplets. This can result in interference with the stabilizer and prevent the buffer from disassociating sufficiently. Therefore, preferably the buffering salts are added to the dispersion phase of the present invention. The salts can then be removed by subsequent processing of the particles or left in the final particle composition, if desired.

Electrostatic stabilization is advantageously used when the suspending liquid is relatively polar (e.g., benzyl alcohol, butyl alcohol). Electrostatically stabilizable, acidic stabilizers include latex and microgel stabilizers having an acid component such as methacrylic acid. Electrostatically stabilizable, basic stabilizers include latex stabilizers having a basic component, such as 4-vinyl pyridine. These and other stabilizers useful in the present method are disclosed in U.S. Pat. Nos. 4,965,131 to Nair, et al. (latex stabilizers), and 4,758,492 to Nair (microgel stabilizers), the disclosures of which are hereby incorporated by reference.

The stabilizer can also be stabilized by solvation in the suspending liquid. For the purposes of this invention, solvation is defined as the state in which a molecule or segment of a colloid stabilizer (i.e., solute) is surrounded by solvent molecules due to an attraction between the solvent molecules and the solute. Hydration is commonly used to describe solvation of a solute by water. Because the solute is encased by one or more layers of solvent, the physical properties of the solute are screened from other solute species. This prevents aggregation of the solute particles and, therefore, stabilizes the dispersion of solute. The stabilizer can be solvated either in the suspending liquid or in a "predispersing" liquid which is later added to the suspending liquid either before or after it is sheared with the dispersion phase.

Solvation can be advantageously used when electrostatic stabilization of the stabilizer is not possible due to its nonpolar nature and when the dispersion phase is much less polar than water and does not readily support a high charge density on the stabilizer. A nonionic stabilizer should have at least two distinct chemical components so that at least one region of the stabilizer is preferentially solvated by the dispersion phase and another preferentially solvated by the suspending liquid. A cosolvent can be used to predisperse the stabilizer to facilitate solvation. Examples 9 and 11 give details of inverse limited coalescence using a nonionic stabilizer predispersed in a cosolvent.

Preferably, stabilization of the stabilizer is accomplished either by electrostatic stabilization or a 35 combination of electrostatic stabilization and solvation because electrostatic stabilization can often be accomplished simply by adjustment of the potential-determining ion. Solvation requires the selection of a stabilizer that has the appropriate composition to be solvated either by the suspending liquid or a predispersing liquid. This may require time-consuming experimentation for each different inverse limited coalescence system used.

Preferably, the stabilizer is predispersed separately in a predispersing liquid and then added to either the suspension (i.e., after the dispersion phase is mixed with the suspending liquid) or to the suspending liquid before the suspending liquid is mixed with the dispersion phase. The dispersion of stabilizer, which is stabilized electrostatically and/or by solvation, can be added to the hydrophobic suspending liquid using a degree of mutual miscibility between the suspending liquid and the predispersing liquid while maintaining stabilization of the colloidal stabilizer.

The predispersing liquid can be the same as or different than the suspending liquid depending on the stabilizer, the dispersant, and the suspending liquid utilized. For example, if the suspending liquid is too nonpolar to allow satisfactory electrostatic stabilization of the stabilizer, the predispersing liquid is preferably a liquid more polar than the suspending liquid. The predispersing liquid can be a solvent that is miscible with the suspending liquid, a combination of one or more liquids with the suspending liquids that form a single phase (e.g., a mixture of the suspending liquid and the dispersant made miscible by a cosolvent), or a liquid having a mutual miscibility with the suspending liquid (including the dispersant). Exemplary predispersing liquids for stabilizers having ionizable groups include methanol, ethanol, butanol, ethyl acetate, and liquid primary, secondary, and tertiary amines.

For stabilizers that do not have ionizable groups, one segment of the stabilizer must be preferentially solvated by the dispersion phase and, therefore, will not be strongly solvated by the suspending liquid. Therefore, the stabilizer must be predispersed in a cosolvent which will solvate both the stabilizer segments solvated by the dispersant as well as the suspending liquid. For example, methanol, ethanol, acetone, and the like are useful cosolvents for stabilizers partially solvated by suspending liquids such as dichloromethane, and aromatic and aliphatic solvent and which are partially solvated by very polar dispersants such as water. For less polar dispersants (e.g., methanol) predispersing liquids such as ethyl acetate and SOLVESSO 100™ (a mixture of aromatic solvents with boiling points between 154° C. and 174° C. available from Exxon Corp.) can be used with an aliphatic suspending liquid.

The amount of predispersing liquid added to the suspending liquid must be less than the miscibility limit of the predispersing liquid in the suspending liquid. This is necessary for complete transfer of the colloidal stabilizer to the suspending liquid. A small amount of cosolvent can be used to increase this limit to obtain the desired degree of coalescence of the dispersion phase droplets. The predispersing liquid is selected so that dilution by the suspending liquid reduces or eliminates solvation of the stabilizer by the predispersing liquid.

A preferred manner of introducing the stabilizer to the suspending liquid is by transfer of the stabilizer to a small amount of the suspending liquid under conditions of electrostatic stabilization. Addition of this colloid dispersion to the suspending liquid will destabilize the dispersion of colloidal stabilizer and, therefore, the limited coalescence process must occur soon after. This can be accomplished by first mixing the suspending liquid and the dispersion phase under high shear and then adding the colloidal dispersion of stabilizer to the suspension so that, as the colloid destabilizes in the suspending liquid, the colloid is adsorbed at the interface between the dispersion phase and suspending liquid. This process of introducing the stabilizer to the suspension allows the suspending liquid to displace the predispersing liquid by solvation, while preventing aggregation of the stabilizer due to decreased stabilization because of the high shear as well as the immediate adsorption of the stabilizer onto the interface.

A stabilizer that is polar in nature but does not have ionizable groups can be introduced to the suspending liquid using solvation in a cosolvent. Here, the stabilizer should not be readily dispersible in either the suspending liquid or the dispersant so as to not have a preference for either the dispersion phase or the suspending liquid after addition to the suspended liquid. For example, a microgel composed of 81 wt % isobutyl methacrylate, 15 wt % ethyl hexyl methacrylate, and 4 wt % divinyl benzene, dissolved in SOLVESSO 100™ is a useful stabilizer for methanol dispersions suspended in ISOPAR G™ (a mixture of isoparaffins with a boiling points between 159° C. and 174° C. available from Exxon). This method of solvation by a cosolvent can also be used with colloids with ionizable groups. For example, a microgel with a composition of 80 wt % isobutyl methacrylate, 15 wt % ethyl hexyl methacrylate, 2 wt % methacrylic acid, and 3 wt % divinyl benzene, dispersed at 10 wt % in ethyl acetate with 0.1 pph 58 wt % $NH_4OH$ as a potential-determining ion regulator.

The dispersant can be removed from the coalesced droplets by any known method. Useful methods are described in U.S. Pat. No. 4,833,060 to Nair et al. In addition, the dispersant can be removed by solvent extraction as disclosed in co-pending U.S. patent application Ser. No. 07/888,064 to K. D. Lofftus, entitled "SOLVENT EXTRACTION IN LIMITED COALESCENCE PROCESSES," filed May 26, 1992, which disclosure is hereby incorporated by reference.

The solidified particles are removed from the suspending liquid by any known method (e.g., sedimentation or filtration) and dried. Drying can be aided by washing the particles with a volatile hydrophobic solvent to remove residual suspending liquid.

Although typically spherical particles are manufactured by the present method, uniformly-shaped nonspherical particles having a narrow size distribution can also be produced. In accordance with the present method, the particle shape is controlled by selecting properties of the stabilizer to form a stabilizer skin around the dispersion phase droplet. In addition, the stabilizer's properties can be selected to promote selective aggregation of the dispersion phase droplets which can produce clusters of spherical particles or linear chains of particles. An irreversible skin of colloidal stabilizer is formed around the dispersion phase droplets and is used to control particle morphology. Additives such as surface active colloids with ionized groups of the opposite polarity as those on the stabilizer or block copolymers that are surface active can be used to interact with the stabilizer and form an irreversible skin. Also, adjustment of the balance between the polar and hydrophobic nature can be used to control particle morphology. For polymeric colloidal stabilizers such as lattices and microgels, swelling of the stabilizer by electrostatic repulsion or solvation allows the polymer branches in the stabilizer to entangle and form an irreversible skin when the swelling is reduced.

Additionally, the residence of the colloid stabilizer preferentially on one side of the dispersion phase droplet/suspending liquid interface can be used to control the particle morphology. In inverse limited coalescence processes using a latex stabilizer, the swelling of the latex by the suspending liquid and a high degree of ionization, allowing the entanglement of the polymer branches, combined with the residence of the latex stabilizer at the dispersion phase droplet side of the interface to form a highly irreversible stabilizer skin. This skin may have sufficient hydrophilic character to cause slight aggregation. Shear flow can be used to align most of the droplets in aggregates along an axis. The resulting alignment is fixed by chain entanglements of the stabilizer skin in the dispersion phase droplets and particles with a prolate shape of substantial aspect ratio are formed.

A small reduction in ionization will prevent aggregation but still produce an irreversible skin of stabilizer. Depending upon the stiffness of the skin, the droplet will collapse at one, two, three, or more points when the dispersant is removed. Collapse at one point will result in dimpled spheres for high wt % dispersions or "deflated" spherical particles. Collapse at two points results in an oblate particle, while collapse at three or more points on a plane results in prolate particles. Wrinkled particles are formed by soft stabilizer skins.

Another particle morphology is obtained in the present method when the stabilizer resides primarily in the suspending liquid. The stabilizer will reside primarily in the suspending liquid when there is a low degree of ionization or solvation of the stabilizer by the dispersant as well as when there is little solvation of the stabilizer by the suspending liquid. In these circumstances, surface forces are able to rearrange the colloidal stabilizer on the droplet surface resulting in the formation of smooth spheres when the dispersant is removed. When latex stabilizers are used, a small degree of ionization prevents swelling due to solvation by the suspending liquid. A further reduction in ionization can result in some swelling by solvation in the suspending liquid leading to aggregation due to polymer branch entanglements allowing the formation of aggregates of spheres.

The present invention is further illustrated by the following non-limiting examples.

EXAMPLES

Example 1

A dispersion phase containing 860 g of $Fe_2O_3$, 140 g of $SrCO_3$, 40 g of gum arabic, 3.3 ml of DAXAD™, and 750 ml of water was milled for 18 hours. The pH of the dispersion phase was 9.1 and was adjusted to 6.6 by the addition of 2.5 ml of acetic acid followed by milling for 10 minutes. This was combined with a suspension phase consisting of 150 ml of water dissolved in 1850 ml of benzyl alcohol. The combination was the mixed with a lab mixer and 14 ml of a 10.7 wt % aqueous dispersion of a latex stabilizer was added. The latex stabilizer had an average particle size of 48 nm and the following composition: 24 wt % styrene, 38 wt % n-butyl acrylate, 30 wt % 2-hydroxyethyl methacrylate, 5 wt % methacrylic acid, and 3 wt % ethylene glycol dimethacrylate. The latex stabilizer formed a polymer colloid of composition in water of 25 weight wt % styrene, 39 wt % n-butyl acrylate, 28 wt % 2-hydroxyethyl methacrylate, 4.9 wt % methacrylic acid, and 3 wt % ethylene glycol dimethacrylate and a water soluble polymer at 0.288 solids comprising 88 wt % 2-hydroxyethyl methacrylate and 12 wt % methacrylic acid. The pH of the suspension was raised by adding 1 ml of 58 wt % $NH_4OH$. After a short period of shear mixing, the limited coalescence suspension was solvent extracted by addition to 8.0 liters of benzyl alcohol and stirred for 30 seconds. After the resulting particles settled, the benzyl alcohol was decanted. Residual benzyl alcohol was removed by resuspending the particles in approximately 2.5 liters of isopropanol with stirring, allowing the particles to settle, and decanting the isopropanol. The particles where then dried, heated in a pan until the gum arabic ignited, cooled, and sieved on 230 mesh screen to remove 2 g of oversize material from 889 g of spherical particles. A portion of this sample was fired at 1200° C. for 10 hours to produce a powder of spherical strontium ferrite useful as an electrostatographic carrier.

Example 2

A limited coalescence system was prepared according to the procedure of Example 1 except 14 ml of a 11.4 wt % aqueous dispersion of a latex stabilizer was added. The latex stabilizer had an average particle size of 91 nm and the following composition: 24 wt % styrene, 38 wt % n-butyl acrylate, 30 wt % 2-hydroxyethyl methacrylate, 5 wt % methacrylic acid, and 3 wt % ethylene glycol dimethacrylate. The latex stabilizer formed a polymer colloid of composition in water of 25 weight wt % styrene, 38 wt % n-butyl acrylate, 29 wt % 2-hydroxyethyl methacrylate, 5.4 wt % methacrylic acid, and 3 wt % ethylene glycol dimethacrylate and a water soluble polymer at 0.21 wt % solids comprising 65 wt % 2-hydroxyethyl methacrylate and 35 wt % methacrylic acid. The amount of 58 wt % $NH_4OH$ was increased to 2 ml to increase the pH of the suspension. The samples was sieved at 170 mesh to remove 8.4 g of oversize material from 878 g of particles with an aspect ratio between 1.2 and 3.

Microscopic examination revealed that the particles formed had an elongated shape and narrow particle size distribution. The latex composition formed an irreversible skin at a higher pH, preventing rearrangement into spherical droplets during the limited coalescence. A portion of this sample was fired at 1200° C. for 10 hours to produce a powder of uniformly non-spherical strontium ferrite having a narrow particle size distribution useful as an electrographic carrier.

Example 3

A dispersion phase consisting of 70.9 g of $Fe_2o_3$, 5.37 g of $SrCO_3$, 22.14 g of $CoCO_3$, 1.61 g of $La_2O_3$, 5.64 g of gum arabic, 0.46 ml of DAXAD 32™, and 75 ml of water was milled for about 20 hours. The pH was adjusted from 9.05 to 7.6 by milling for about 10 minutes with 0.2 ml of acetic acid. The dispersion phase was combined with a suspension phase consisting of 25 ml of water dissolved in 275 ml of benzyl alcohol and mixed with a lab mixer. During shear mixing in a lab mixer, 10 ml of a 3 wt % aqueous dispersion of a latex stabilizer having an average particle size of 25 nm and the composition of the stabilizer used in Example 2 was added. Aggregated dispersion phase droplets were dispersed by adding 0.2 ml of 58 wt % $NH_4OH$ to the suspension. Another 0.2 ml of $NH_4OH$ was added to further stabilize the coalesced droplets. High shear mixing was performed on the sample using a Microfluidizer model 110F manufactured by Microfluidics of Newton Massachusetts. The output of this device was directed into 800 ml of benzyl alcohol to extract the dispersant and solidify the particles. After settling, the benzyl alcohol was decanted and the sample was washed 3 times with about 300 ml of isopropyl alcohol. Small spherical particles having a narrow size distribution were obtained.

Example 4

A sample was prepared in the same manner as in Example 3 except that no $NH_4OH$ was added. A portion of the sample was fired at 1200° C. for 10 hours. The aggregate morphology was preserved through firing to produce particles having a high surface area and an open regular pore structure consistent with sintered spherical materials. Grinding was not required.

Example 5

A dispersion was prepared in the same manner as in Example 3 except that the sample was milled for 10 minutes with 50 ml water to decrease the wt % solids in the dispersion phase and 0.25 ml of acetic acid was added to adjust the pH to 7.4. The suspension phase was the same as in Example 3. The stabilizer was 6.5 ml of a 3 wt % aqueous dispersion of a latex having a composition of 8 wt % styrene, 50 wt % n-butyl acrylate, 22 wt % 2-hydroxyethyl methacrylate, 13 wt % methacrylic acid, and 7 wt % ethylene glycol dimethacrylate. The sample was shear mixed in a lab mixer and added to 500 ml of benzyl alcohol. Another 800 ml of benzyl alcohol was added to remove any extra water. After sedimentation, the sample was decanted and washed three times in about 300 ml of isopropanol. Microscopic examination revealed the formation of uniformly wrinkled, i.e., non-spherical, particles having a narrow particle size distribution.

Example 6

A dispersion phase including 86 g $Fe_2O_3$, 14 g $SrCO_3$, 4 g gum arabic, 0.33 ml of polymethacrylic acid solution, and 75 g water and a suspending liquid including 250 ml n-butyl alcohol and 50 ml water were mixed to form a suspension. 2.5 ml of a 11 wt % aqueous dispersion of latex stabilizer having a composition 28 wt % styrene, 36 wt % n-butyl acrylate, 28 wt % 2-hydroxyethyl methacrylate, 5 wt % methacrylic acid, and 3 wt % ethylene glycol dimethacrylate was added to the suspension. The suspension was added to 500 ml butanol extracting liquid and the resulting particles were allowed to settle. The butanol was decanted and the particles were washed with about 350 ml of isopropyl alcohol. Microscopic examination revealed smooth, spherical particles having a narrow size distribution.

Example 7

A dispersion phase containing 36.9 g of $BaSO_4$, 7.5 g of $(NH_4)_2SO_4$, 15.15 g of $SrCl_2$, 3 g of gum arabic, 0.5 ml of polymethacrylic acid solution, and 125 g of decarbonated water was prepared. The stabilizer was 15 ml of a 3 wt % aqueous dispersion of the latex stabilizer of Example 3. The stabilizer was added to a suspending liquid which included 465 ml benzyl alcohol and 35 ml water The dispersion phase and the suspending liquid were mixed in a lab mixer for 1 minute. The resulting suspension was then added to 2000 ml of benzyl alcohol with stirring. Rapid sedimentation occurred due to reversible agglomeration of the particles allowing decantation of the benzyl alcohol. Residual amounts of benzyl alcohol were removed by repeated cycles of resuspension of the particles in methylene chloride, sedimentation, and decantation. The residual methylene chloride was removed by evaporation under a loose cover to minimize the condensation of ambient moisture.

Spherical particles were formed with a narrow particle size distribution and a mean particle size of about 5.0 μm. The particles were fired for 1.5 hours at 1000° C. and maintained a spherical shape with narrow size distribution while acquiring a good crystallinity as measured by x-ray defraction (results not shown).

Example 8

A dispersion phase containing 36.9 g of $BASO_4$, 7.5 g of $(NH_4)_2SO_4$, 15.15 g of $SrCl_2$, 0.29 g. of $EuCl_3$, 3 g of gum arabic, 0.5 ml of polymethacrylic acid solution, and 125 g of decarbonated water was prepared. The stabilizer was 15 ml of a 3 wt % aqueous dispersion of the latex stabilizer of Example 3. The stabilizer was added to a suspending liquid which included 465 ml benzyl alcohol and 35 ml water. The dispersion phase and the suspending liquid were mixed in a lab mixer for 1 minute. The resulting suspension was then added to 2000 ml of benzyl alcohol with stirring. Rapid sedimentation occurred due to reversible agglomeration of the particles allowing decantation of the benzyl alcohol. Residual amounts of benzyl alcohol were removed by repeated cycles of resuspension of the particles in methylene chloride, sedimentation, and decantation. The residual methylene chloride was removed by evaporation under a loose cover to minimize the condensation of ambient moisture.

Spherical particles were formed having a narrow particle size distribution with a mean particle size of about 5.0 μm. The particles were fired for 1.5 hours at 1000° C. to produce non-magnetic, solid inorganic phosphor particles. The phosphor particles maintained a spherical shape with narrow size distribution while exhibiting good crystallinity as measured by x-ray defraction (results not shown) and fluorescence from an x-ray source (results not shown).

Example 9

A dispersion phase of 25 g of $BaTiO_4$, 25 g water, 1.2 g gum arabic, and 0.1 ml 58 wt % $NH_4OH$ was prepared and mixed with a suspending liquid including 145 ml benzyl alcohol and 5 ml water to form a suspension. The stabilizer (3 ml of a 10.7 wt % dispersion of the latex stabilizer of Example 1) was then added to the suspension. Benzyl alcohol (700 ml) was added to remove the dispersant. The resulting particles were spherical in shape.

Example 10

A dispersion phase including 46.4 g $Fe_2O_3$, 3.6 g $SrCO_3$, 4 g gum arabic, 2.5 g of polymethacrylic acid, 0.16 ml of DAXAD 32™, and 105 g methyl alcohol was mixed with a suspending liquid including 400 ml of ISOPAR G™ to form a suspension. 8.0 ml of a microgel stabilizer having a composition of 81 wt % isobutyl methacrylate, 15 wt % ethylhexyl methacrylate, and 4 wt % divinyl benzene was predispersed in a concentration of 11 wt % in SOLVESSO O™. The colloidal dispersion of stabilizer was then added to the suspension. The suspension was allowed to settle and the excess liquid was decanted. The dispersant was extracted in stages by mixing with an extracting liquid comprising 275 ml of ISOPAR G™ and 25 ml of SOLVESSO 100™, allowing the particles to settle, and separating the resultant particles by decanting. This step was repeated twice and then a final stage of extraction was attempted with an extracting liquid comprising 250 ml of ISOPAR G™ and 50 ml of SOLVESSO 100™. The final stage of extraction destabilized the particles due to the removal of the stabilizer. The resulting dispersion phase was resuspended in 300 ml of ISOPAR G™ and 9 ml of the stabilizer dispersion. The resulting suspension was extracted using 5 stages with an extracting liquid including 275 ml of ISOPAR G™ and 25 ml of SOLVESSO 100™. The residual extracting liquid was removed by evaporation. The particles formed were spherical and had a narrow particle size distribution.

The invention has been described in detail with particular reference to certain preferred embodiments thereof, but it will be understood that variations of modifications can be effected within the spirit and scope of the invention as described hereinabove and as defined in the appended claims.

What is claimed is:

1. A method of making particles, having a controlled particle size distribution and morphology, from inorganic hydrophilic materials and using a colloidal dispersion of an organic stabilizer, comprising the steps of:

dispersing inorganic hydrophilic material in a polar dispersant to form a dispersion phase;

mixing said dispersion phase with a suspending liquid, which is substantially immiscible with said dispersant and less polar than said dispersant, under high shear to produce a suspension of coalesced dispersion phase droplets in said suspending liquid, wherein said suspension contains a colloidal dispersion of an organic stabilizer which controls said dispersion phase droplets' coalescence; and removing said dispersant from said coalesced droplets to form particles comprising said inorganic hydrophilic materials and a surface coating comprising said organic stabilizer, said particles having a controlled size distribution and morphology.

2. A method according to claim 1, wherein said organic stabilizer is added to said suspension after said mixing.

3. A method according to claim 2, further comprising the step of predispersing said organic stabilizer in a predispersing liquid.

4. A method according to claim 1, wherein said organic stabilizer is added to said suspending liquid before said mixing.

5. A method according to claim 1, wherein said colloidal dispersion of said organic stabilizer is electrostatically stabilized in said suspension.

6. A method according to claim 5, wherein said suspension has a pH either in the range of about $pk_a$ to $pk_a+5$ if said organic stabilizer has an acid group, at a pH in the range of about $14-pk_b$ to $9-pk_b$ if said organic stabilizer has a base group, or within 5 pH units of said organic stabilizer's isoelectric point if said organic stabilizer is amphoteric, wherein $pk_a$ is said acid group's $pk_a$ and $pk_b$ is said base group's $pk_b$.

7. A method according to claim 6, wherein said suspension has a pH either in the range of about $pk_a+1$ to $pk_a+4$ if said organic stabilizer contains an acid group, at a pH in the range of about $13-pk_b$ to $10-pk_b$ if said organic stabilizer contains a base group, or within about 1 to 4 pH units of said organic stabilizer's isoelectric point if said organic stabilizer is amphoteric.

8. A method according to claim 1, wherein said organic stabilizer is substantially stabilized in said suspension by solvation.

9. A method according to claim 1, wherein said organic stabilizer is stabilized in said suspension by a combination of electrostatic stabilization and solvation.

10. A method according to claim 1, wherein said removing comprises evaporating said dispersant from said coalesced droplets.

11. A method according to claim 1, wherein said hydrophilic materials are selected from the group consisting of oxides, carbonates, sulfates, phosphates, tungstates, molybdates, titanates, hydroxides and water soluble salts.

12. A method according to claim 1, wherein said dispersant is water.

13. A method according to claim 12, wherein said suspending liquid is selected from the group consisting of normal, secondary, tertiary, and cyclic alcohols containing at least four carbon atoms, aromatic alcohols, ketones having three or more carbon atoms, halogenated solvents, and esters.

14. A method according to claim 1, wherein said dispersant is selected from the group consisting of methanol, benzyl alcohol, N,N-dimethyl formamide, glycerol, ethylene glycol, and combinations thereof.

15. A method according to claim 14, wherein said suspending liquid is selected from the group consisting of aliphatic liquids.

16. A method according to claim 1, wherein an irreversible skin of said organic stabilizer is formed around said dispersion phase droplets.

17. A method according to claim 16, comprising adding surface active colloids or block polymers which interact with said organic stabilizer, thereby forming said irreversible skin.

18. A method according to claim 16, wherein said organic stabilizer is a branched polymeric colloid and said forming comprises swelling said organic stabilizer to allow said polymeric colloid's branches to entangle and form said irreversible skin when said swelling is reduced.

19. A method according to claim 1, wherein said particles are fired to form magnetic particles having a controlled particle size distribution and morphology.

20. A method according to claim 19, wherein said magnetic particles are $SrFe_{12}O_{19}$ or $BaFe_{12}O_{19}$.

21. A method according to claim 1, wherein said particles are fired to form non-magnetic phosphor particles having a controlled particle size distribution and morphology.

22. A method according to claim 21, wherein said non-magnetic phosphor particles comprise barium/strontium sulphate doped with curopium.

23. A method according to claim 1, wherein said polar dispersant further comprises a binder.

24. A method according to claim 23, wherein said dispersion phase comprises $Fe_2O_3$, $SrCO_3$, and a binder.

25. A method according to claim 23, wherein said dispersion phase comprises $Fe_2O_3$, $SrCO_3$, $CoCO_3$, $La_2O_3$, and a binder.

26. A method according to claim 23, wherein said dispersion phase comprises $BaSO_4$, $(NH_4)_2SO_4$, $SrCl_2$, and a binder.

27. A method according to claim 23, wherein said dispersion phase comprises $BaSO_4$, $(NH_4)_2SO_4$, $SrCl_2$, $EuCl_3$, and a binder.

28. A method according to claim 23, wherein said dispersion phase comprises $BaTiO_4$ and a binder.

29. A method according to claim 23, wherein said binder comprises gum arabic.

30. A method according to claim 1, wherein said inorganic hydrophilic material further comprises a glass-forming composition capable of forming a glass matrix upon firing.

31. A method according to claim 30, wherein said particles are fired to form two-phase particles, said particles having a controlled particle saize and morphology and including a first phase comprising a magnetic, inoganic material and s second phase comprising a glass matrix.

32. A method according to claim 31, wherein said magnetic material is $SrFe_{12}O_{19}$ or $BaFe_{12}O_{19}$.

33. A method according to claim 30, wherein said glass-forming composition comprises about 10 to 20 molar percent $V_2O_5$, about 10 to 20 molar percent BaO and about 10 to 40 molar percent $B_2O_3$.

34. A method of making ferrite particles, comprising the steps of:

dispersing a ferrite-forming material in a polar dispersant to form a dispersion phase;

mixing said dispersion phase with a suspending liquid, which is substantially immiscible with said dispersant and less polar than said dispersant, under high shear to produce a suspension of coalesced dispersion phase droplets in said suspending liquid, wherein said suspension contains a colloidal dispersion of an organic stabilizer which controls said dispersion phase droplets' coalescence;

removing said dispersant from said coalesced droplets to form nonmagnetic particles having a surface coating comprising said organic stabilizer, said particles having a controlled size distribution and morphology; and firing said nonmagnetic, particles to form magnetic, ferrite particles having a controlled size distribution and morphology.

35. A method according to claim 34, wherein said ferrite-forming material contains an iron compound together with a strontium compound or a barium compound.

36. A method of making particles, having a controlled particle sire distribution and morphology, from inorganic hydrophilic materials and using a colloidal dispersion of an organic stabilizer, comprising the steps of:

dispersing inorganic hydrophilic material in a polar dispersant to form a dispersion phase, wherein said dispersant is selected from the group consisting of water, methanol, benzyl alcohol, N,N-dimethyl formamide, glycerol, ethylene glycol, and combinations thereof;

mixing said dispersion phase with a suspending liquid selected from the group consisting of normal, secondary, tertiary, and cyclic alcohols containing at least four carbon atoms, aromatic alcohols, ketones having three or more carbon atoms, halogenated solvents, esters, and aliphatic liquids, under high shear to produce a suspension of dispersion phase droplets in said suspending liquid, wherein said suspension has a pH either in the range of about $pk_a$ to $pk_a+5$ if said organic stabilizer has an acid group, at a pH in the range of about $14-pk_b$ to $9-pk_b$ if said organic stabilizer has a base group, or within 5 pH units of said organic stabilizer's isoelectric point if said organic stabilizer is amphoteric, wherein $pk_a$ is said acid group's $pk_a$ and $pk_b$ is said base group's $pk_b$, said wherein said suspension contains a colloidal dispersion of a predispersed organic stabilizer which controls said dispersion phase droplets, coalescence to produce coalesced droplets having a controlled particle size distribution and morphology, wherein said colloidal dispersion of said organic stabilizer is stabilized by a combination of electrostatic stabilization and solvation; and removing said dispersant from said coalesced droplets to form particles comprising said hydrophilic inorganic material and having a surface coating comprising said organic stabilizer, said particles having a controlled size distribution and morphology.

\* \* \* \* \*